United States Patent [19]

Rawlings

[11] Patent Number: 5,338,369
[45] Date of Patent: Aug. 16, 1994

[54] ROOF-INTEGRATABLE PHOTOVOLATIC MODULES

[76] Inventor: Lyle K. Rawlings, 66 Snydertown Rd., Hopewell, N.J. 08525

[21] Appl. No.: 17,520

[22] Filed: Feb. 16, 1993

[51] Int. Cl.$^5$ ............... H01L 31/052; H01L 31/18; H01L 31/048
[52] U.S. Cl. ................ 136/246; 136/251; 136/291; 437/2; 437/209; 437/224
[58] Field of Search ............ 136/244, 246, 251, 291; 437/2-5, 209, 211, 224

[56] References Cited

U.S. PATENT DOCUMENTS

| | | | |
|---|---|---|---|
| 4,104,083 | 8/1978 | Hirano | 136/251 |
| 4,233,085 | 11/1980 | Roderick et al. | 136/244 |
| 4,336,413 | 6/1982 | Tourneux | 136/251 |
| 4,582,953 | 4/1986 | Nagase et al. | 136/259 |
| 4,617,421 | 10/1986 | Nath et al. | 136/244 |
| 4,636,577 | 1/1987 | Peterpaul | 136/206 |
| 4,652,693 | 3/1987 | Baron | 136/251 |
| 4,677,248 | 6/1987 | Lacey | 136/244 |
| 4,773,944 | 9/1988 | Nath et al. | 136/249 |
| 4,830,038 | 5/1989 | Anderson et al. | 136/251 |
| 4,936,063 | 6/1990 | Humphrey | 52/200 |
| 5,164,020 | 11/1992 | Wagner | 136/251 |

FOREIGN PATENT DOCUMENTS

| | | | |
|---|---|---|---|
| 3619306 | 12/1987 | Fed. Rep. of Germany | 136/251 |
| 1-248568 | 10/1989 | Japan | 136/251 |

OTHER PUBLICATIONS

U.S. Solar Systems Corp., Troy, Mich. Brochure Apr. 1992, nine pages.
Photovolatic Performance and Reliability Workshop, MRE Lab. U.S. Dept. of Energy; Sep. 16-18, 1992; pp. 279-289; 491-493 "World PV-Module Production-UP", Solar Today, Mar.-Apr. 1989 pp. 12, 13, 14 and 22.

Primary Examiner—Aaron Weisstuch
Attorney, Agent, or Firm—Arthur J. Plantamura

[57] ABSTRACT

A solar module design comprises a specially-designed substrate material with interconnected solar cells and topcoat laminated to the top surface by known polymer encapsulation methods. The substrate, which may be extruded in one piece or fabricated, comprises a twin-wall profile with ribs connecting the upper and lower surface. The twin-wall shape connected with ribs results in a substrate material which is very strong, stiff, and rugged, yet lightweight; and which allows the modules to be used as the roof's finished surface, yet allows outside air to pass under the photovoltaic cells to help cool them. Also, the substrate incorporates means of interconnecting modules and fastening them to roof decking or framing members and simplified means of connecting the modules to an external electrical circuit. The features of the substrate and module design result in modules which can be very large in format, yet which are very light and rugged compared to current art. The module substrate can be produced inexpensively. Installation of the modules is rapid and simple. Installed systems using the module design feature a monolithic, smooth, unbroken surface, which helps to prevent the accumulation of debris, snow, ice, or dirt.

17 Claims, 3 Drawing Sheets

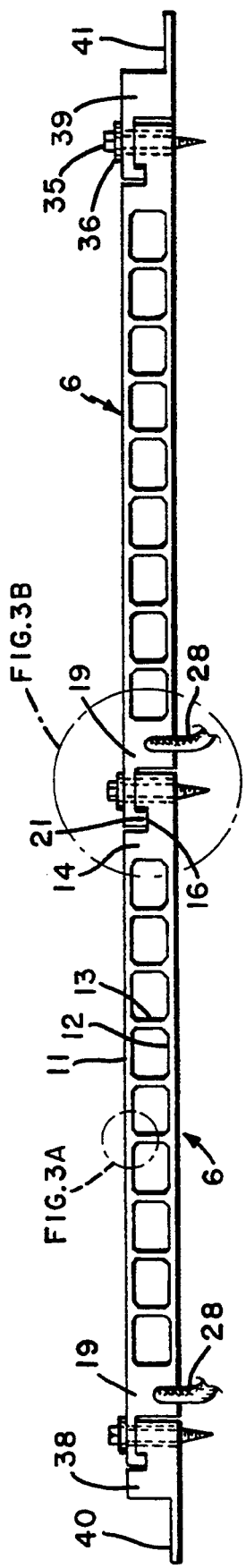
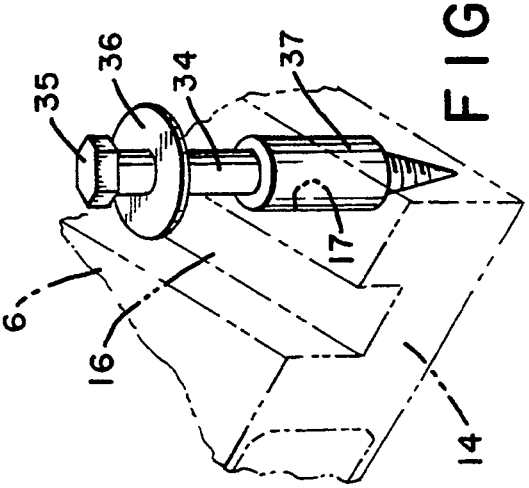
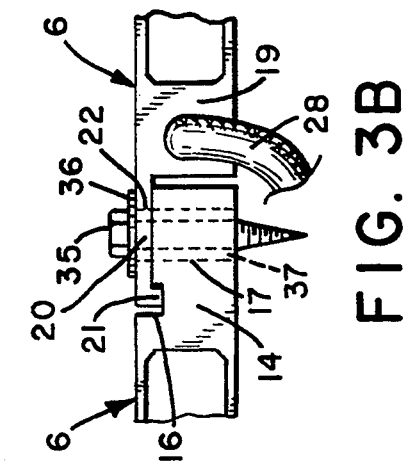
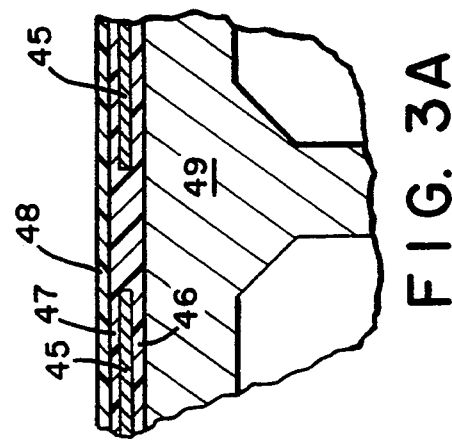

ROOF-INTEGRATABLE PHOTOVOLATIC MODULES

FIELD OF THE INVENTION

This invention relates generally to a photovoltaic module and to a method for manufacturing large-area photovoltaic modules. More specifically, this invention relates to a photovoltaic module for integration into the roof of a building. The module comprises a specially-designed substrate having solar cells, encapsulated within a synthetic polymeric resin composition, on the top surface of the module.

BACKGROUND OF THE INVENTION

Presently the largest single application area for photovoltaic modules in the United States is for residential power in relatively small systems installed on residential roofs. Although the electrical output of the average system size is increasing, with 1 kilowatt to 2 kilowatt systems becoming common, the present known modules are still relatively small and largely insufficient.

Nearly all high-power photovoltaic modules (>40 watts) are manufactured with the photovoltaic cells encased using glass as the top surface or the back surface or both. Usually, a picture flame-style metal frame is attached to the edges of the glass as a containment, and to lend some support to the unit, and to provide a means to fasten the modules to larger frames.

In order to install such prior art modules to a roof, the modules are commonly mounted to a larger frame, e.g., the roof frame, which is in turn directly fastened to the roof on top of the finished roof surface. Alternatively, features of the roof frame are fit into roof jacks which are fastened to the roof, again on top of the finished roof surface.

There are several disadvantages in the known prior art.

Modules which are manufactured using glass as a substrate or superstrate or as both surfaces have a high weight per unit area and are relatively fragile. Although large modules would be desirable in order to minimize handling, wiring, and other installation parameters, the larger the module area, the heavier per unit area and the more fragile the modules become, and the greater the difficulty in handling. Experience with designing and installing a residential photovoltaic system using one such large, commercially available module model having 12.5 square feet of area each has shown that the weight per unit area of these modules is on the order of 3.4 pounds per square foot, and they must be handled with extreme care. With four modules bolted to a wooden frame in a sub-array, the sub-arrays weigh nearly 190 pounds and require mechanized lifting equipment to position them on a roof. A significant fraction of such modules have been found to develop debilitating cracks between the time they are shipped and the end of the first year of operation.

The standard picture frame-stile or other external flaming for the module adds considerable cost in material and labor to the manufacture cost of the finished photovoltaic module.

The design and fabrication of the roof flames and roof jacks is usually left to the installer and involve considerable labor and material cost. Commercially available, pre-made roof frames are similarly expensive.

Significant labor is required to fasten the prior-art modules to the roof frames, and to lay out and fasten the roof frames to the roof; or to lay out and fasten the roof jacks to the roof and the roof flames to the roof jacks.

Because of the construction of such prior art modules, in mounting them spaces usually must be left between modules. This provides an opportunity for debris to collect on the roof. Sometimes spaces must be left which are large enough to permit the installer to fasten between the modules or sub-arrays. The appearance of the module frames and spaces between modules and between sub-arrays is regarded by many homeowners as aesthetically unsightly on a finished roof.

There is also an incentive to reduce installed cost through roof-integrated installations—that is, replacing certain portions of the roof construction with the photovoltaic modules themselves. This root-integration effort has been attempted through approaches similar to glazing methods for skylights, but such glazing methods have resulted in added costs which for the most part are higher than the amounts they save in replacing portions of the roof, therefore defeating their purpose.

Another drawback of most previous roof-integrated photovoltaic module designs and system designs is that they have not allowed for the free flow of cooling air beneath the photovoltaic cells. Higher cell operating temperatures result in lower power output and/or lower voltage from photovoltaic cells. In systems installed on an insulated roof, for example, in typical New Jersey weather conditions, lack of air cooling on the back surface of the photovoltaic cells can result in 40° C. higher cell temperatures compared to systems with back surface air flow, according to calculations based on heat transfer simulations. In crystalline silicon cells, for instance, this temperature increase would decrease power output by about 18%, and in certain instances could lower the module voltage to a level which could not effectively charge batteries. In amorphous silicon cells, as another example, the increase in temperature could result in slightly lower power output. It could also significantly decrease the module voltage, forcing a trade-off between module power output and module design voltage for effective battery charging. If a higher design voltage is chosen to ensure battery charging in hot weather for this reason, the result may be a loss of power for the module in average and colder weather, due to a mismatch between battery voltage and optimum module voltage.

Another problem with higher operating temperatures due to lack of cooling on the back surface of the photovoltaic unit is that most photovoltaic cells and modules have been developed with voltages appropriate for battery charging in systems with back surface cooling. Therefore, raising the maximum operating temperature of such prior art modules may necessitate the redesign of some photovoltaic cells, or the use of odd numbers of them in series, in order to maintain proper voltages.

Other prior art roof integrated module and system designs have attempted to avoid this problem of cooling the cells by utilizing glazing methods for installing the modules over roof framing members with the back surface of the modules open to an unheated attic space. However, this method is not applicable to insulated roofs. Moreover, unheated attic spaces will have a significantly higher air temperature than the outside air, due to solar heat input from the roof, and there will be less air movement underneath the roof compared to the outside air. This will decrease the degree to which the back of the modules can be cooled. If a fan moving a large amount of air through the attic is installed to cool the modules during the summer, additional expense and parasitic power use result.

Accordingly, a need exists for an improved photovoltaic module which has the capability of providing for simplified installation, ease of handling including low weight, ruggedness, high strength, and stiffness, very large module formats, and roof integration without sacrificing superior back surface cooling.

SUMMARY AND OBJECTS OF THE INVENTION

The novel modular design of the invention comprises a substrate upon which a photovoltaic surface material or photovoltaic cell is applied. The substrate comprises a composite of panels of substantially parallel uniformly spaced relationship; an upper panel on which the photovoltaic elements are mounted and a lower panel. This twin-wall panel is formed of a suitable material, preferably a polymeric composition, formed of two planar surfaces separated by longitudinal ribs. This substrate panel may be extruded as a single piece or fabricated from separate sheets and ribs adhered together to form the required shape. The shape of the substrate material—that is, two surfaces connected by ribs into a unitized whole—results in the module's strength, stiffness, ruggedness and light weight, and also results in the ability to utilize the module as the roof's waterproof surface while still allowing the free flow of outside air along the underside of the photovoltaic cells to cool them.

It is an object of the invention to provide a novel photovoltaic modular configuration.

It is another object of the invention to provide a photovoltaic (PV) module which can perform as an integral pan of the roof—that is, which can replace the roofing shingles or other roof finish, and can also replace the roof decking if desired.

it is still another object of the invention to provide a photovoltaic module which allows free flow of outside air at the underside of the solar cells to cool them and thus help to maintain high power output and voltage.

It is a further object of the invention to provide a photovoltaic module which eliminates the material and labor cost arising from the need (as is usually the case in prior art systems) for separate module framing by making the means for module interconnection and fastening to the roof an integral part of the module substrate.

It is still another object of the invention to provide a photovoltaic module which is relatively lightweight and easy to ship and handle.

It is an additional object of the invention to provide a photovoltaic module which has superior resistance to breaking or cracking from bending, twisting, impact-related, and other stresses, and which has appropriate rigidity.

It is yet another object of the invention to provide a photovoltaic module which, because of its relatively light weight, increased strength, and ruggedness, can be provided in a relatively large size, thereby minimizing field handling and wiring requirements and simplifying large-scale system installations.

It is a further object of the invention to provide a photovoltaic module which is relatively inexpensive to manufacture.

It is yet another object of the invention to provide a system which is rapid and simple to install, and which does not require specialized skill, knowledgeable supervisors, extensive planning, or precision for installation.

Yet another object of the invention is to provide an installation procedure which, because of the inherent capability of the solar modules, does not require additional hardware beyond the modules themselves and fasteners.

A further object of the invention is to provide for an installed photovoltaic system in which the finished surface of an array of assembled modules is smooth, flat, and substantially uninterrupted; and which features a high density of photovoltaic cells with little wasted area.

Still another object of the invention is to provide a simple arrangement for connecting photovoltaic system output circuit wires and source circuit wires to the photovoltaic modules.

Additional objects and advantages of the invention will become apparent from the ensuing description when considered in conjunction with the drawings.

BRIEF DESCRIPTION OF THE DRAWINGS

FIG. 3 is an end view of assembled photovoltaic modules of the present invention, showing the way in which modules, when assembled, fit together at the module side edges. Also shown in profile are two specially formed accessory pieces which can be used to aid the installation and integration of the modules on the far left and far right sides of a typical system, with conventional roof shingles.

FIG. 3A is an enlarged cross-sectional view of a portion of the front of a module of FIG. 3 illustrating the encapsulated photovoltaic cells.

FIG. 3B is an enlarged view of another portion of FIG. 3 showing the interconnecting end sections of the modules in greater detail.

FIG. 4 is a perspective view of a fastener for securing the modules onto the roof and shown in relationship to a portion of a module that is illustrated in broken lines.

DETAILED DESCRIPTION OF A PREFERRED EMBODIMENT

Figure 1:
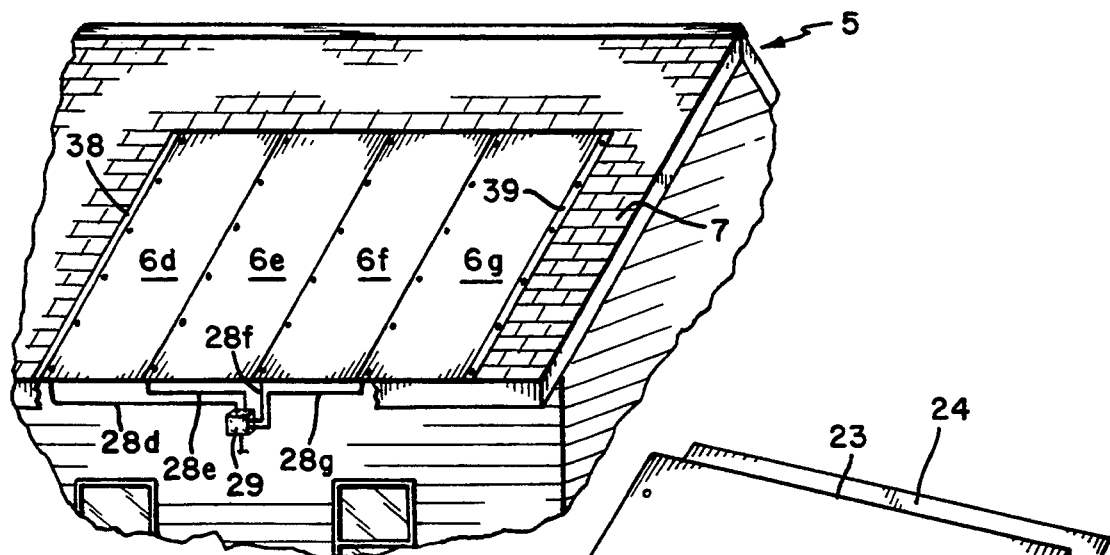
FIG. 1 is a perspective view of a typical installed system consisting of photovoltaic modules of the present invention on a residential roof, and which as shown comprises an array of 4 modules assembled side-by-side.

In accordance with the invention, the novel module design comprises a substrate upon which a photovoltaic surface material or photovoltaic cells is applied. The substrate comprises a composite of substantially uniformly spaced parallel planar panels; an upper panel on which the photovoltaic elements are mounted and a lower panel. This twin-wall shaped composition is formed of a suitable material, preferably a polymeric composition, formed of two planar surfaces separated by longitudinal ribs. The substrate may be extruded as a single piece or fabricated from separate sheets and ribs adhered together to form the required shape. The composite may also be formed by other materials such as a metal, preferably a relatively light weight metal or alloy such as aluminum.

The spaced double wall construction of the substrate gives it high strength and stiffness characteristics compared to its weight due to accepted mechanical engineering principles, similar to those which give like spaced wall structures, e.g., corrugated materials, I-beams, and the like high strength-to-weight ratio characteristics compared to materials with solid cross-sections. The upper wall or front surface face of the substrate of the module provides the surface upon which the photovoltaic cells are affixed and then encapsulated. The spaced lower wall or back surface of the substrate lies upon the roof decking or roof flaming members and may comprise the finished roof surface. The separating ribs joining the upper and lower walls of the spaced substrate. i.e., between the upper planar surface and the lower planar surface, run vertically (up the slope of the roof). The spaces between the upper and lower surfaces and between the ribs provide channels that allow cooling air to flow underneath the photovoltaic cells. When the modules are installed on a pitched roof, the cooling air flows through these channels, entering from the bottom, flowing uninterrupted through the channels, and exiting from the top of the modules. The material which is used in extruding or fabricating the twin-wall substrate will be chosen for its cost, strength-related properties, weatherability, thermal expansion coefficient, and ability to withstand the particular photovoltaic cell encapsulation sequence being employed. Preferably the material used is a suitable synthetic resinous composition, including foamed plastic, which is substantially lighter in weight and offers much higher impact resistance and resistance to cracking and breaking than does glass.

Thus, the shape of the substrate material—that is, two surfaces connected by ribs into a unitized whole—results in the module's strength, stiffness, ruggedness, and light weight, and also results in the ability to utilize the module as the roof's waterproof surface while still allowing the free flow of outside air along the underside of the photovoltaic cells to cool them. The light weight, strength, ruggedness, and stiffness in turn result in the ability to manufacture modules in an unusually large format. A further result is that installed systems using such modules will feature a smooth, unbroken surface which will help prevent the accumulation of snow, ice, debris, and dirt.

The shape of the substrate material also incorporates the means of interconnecting modules in a watertight fashion and means of fastening them to the roof structure. The lateral edges or sides of the substrate preferably comprise solid sections with features which allow the waterproof interconnection of modules along their sides. The sides are preferably provided with a mating design, preferably comprising a solid linear edge at two sides of the module so that modules can be easily and quickly laid side-by-side and interconnected in a rugged, watertight assembly. Fasteners are preferably provided to be driven through matching holes in the overlapping sides, i.e., the solid edges, and into the roof sheathing and/or roof framing members. Suitable sealing washers may be used to provide a waterproof seal over the holes. An edge or edges of the substrate may be provided with a skirt (a side of the module) over which roofing shingles are laid, or over which vertically adjoining modules are laid.

The modules are sized to be large enough so that a photovoltaic system to fully power a residence can be built using a single row of modules. Installation, which is readily effected manually, will proceed from left to right or vice-versa with modules secured in place one by one. The modules are devised to be fastened by roofers or other workers without the need for special experience or special skill regarding photovoltaic modules. The photovoltaic modules of the invention with the proper selection of materials can be fabricated so as to be strong enough to be walked upon or to have a ladder placed against them, in order to make the installer's job easier, without incurring damage.

While the present invention is intended primarily for photovoltaic (PV) modules which are installed on the roofs of buildings, the modules produced according to the present invention may also be used by utility companies for large-scale, grid-connected PV power stations because of the relatively large format of the modules of the invention and the potential for low-cost manufacture and ease of installation.

In the preferred embodiment of the present invention, a substrate consisting of spaced coplanar surfaces, e.g., a twin-wall profile with ribs separating the upper and lower surface is used as a substrate upon which to mount photovoltaic cells. The substrate comprising the twin-wall composite preferably is extruded as a single piece from a suitable plastic composition. A preferred synthetic resinous composition which may be employed in fabricating the twin-wall substrate is chlorinated polyvinyl chloride (CPVC). However, a variety of other synthetic resinous materials which possess the requisite properties conducive to the intended use may be used, including foamed and reinforced plastics, e.g., various polyolefins, such as polypropylene, polybutylene and blends thereof, polycarbonate, acrylics, and the like.

The height of the module profile (that is, the thickness of the substrate) may vary within fairly wide limits. In one embodiment, for example, the height may be of order of 25 millimeters (mm), or about 1 inch. The range for profile thickness, for most applications, may vary generally from about 15 mm. to 50 mm. The width of the substrate in one embodiment may be, for example, 132 cm (52 inches), while it may vary generally from a width of about 60 cm. (2 feet) to about 180 cm. (6 feet). More often a module width may vary from about 70 cm. to about 165 cm. The length of the substrate in one embodiment may be about 310 cm. (122 inches). The range of values for module length may vary from about 120 cm. to 475 cm.

The photovoltaic element applied on the module's substrate is also suitably sized and may vary. In a particular example, the photovoltaic cell which is affixed to the front surface of the extruded substrate is a 30 cm. by 30 cm. (approx. 1 ft. by 1 ft.) square, multi-junction, amorphous silicon cell developed by United Solar Systems of Troy, Mich. The rated power output per cell is on the order of 7.5 watts, and the voltage at the maximum power point is on the order of 1.7 volts. Forty cells are affixed to the top surface of the extruded substrate using a permanent adhesive. The cells are electrically interconnected 10 in series for modules used for nominal 12-volt applications (nominal 12 volts is the most common module voltage); 20 in series for nominal 24-volt modules and all 40 in series for nominal 48-volt modules. The module's rated power output is on the order of 300 watts. The approximate weight of each module is 50 pounds, or on the order of 1.2 pounds per square foot. A 2.1-kilowatt residential system would consist of 7 such modules in a single row, 10 feet high by 30 feet wide.

The photovoltaic cells applied on the surface of the module are encapsulated using a suitable stable clear polymer, e.g., "Tefzel" clear fluoropolymer film manufactured the Dupont Company as the top-coat, with ethylene vinyl acetate (EVA) as the encapsulant (adhesive/sealant) between the Tefzel and the photovoltaic cells. It will be apparent that other suitable PV cell encapsulation material systems and methods may be used.

Referring now more particularly to FIG. 1 of the drawing, there is shown a fragmentary perspective view of a residential building 5, on which a battery of four modules 6d, 6e, 6f, 6g are affixed to the shingled roof 7 of the building 5.

Figure 2:
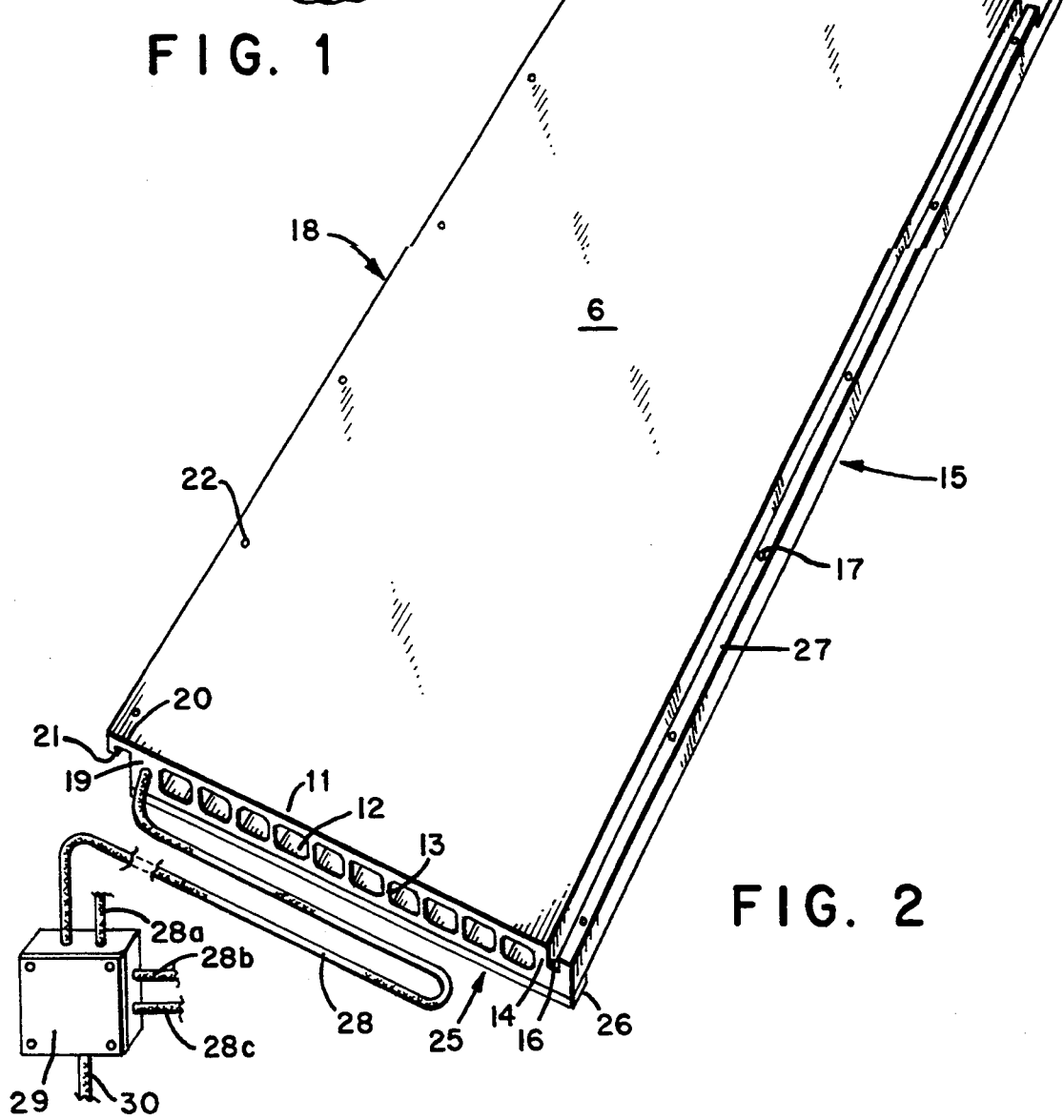
FIG. 2 is an enlarged perspective view of a photovoltaic module according to the invention and including an electrical wire to deliver electrical output from the module.

Referring to FIG. 2, an enlarged view of a module 6 of the invention with related attachment and connection elements is illustrated. The module comprises an upper panel surface 11 and a lower panel surface 12 connected in spaced relationship to the upper panel surface 11 by ribs 13. The module 6 is provided with a side edge element or portion 14 along one side 15. Portion 14 may be extruded as an integral pan of the substrate of the module when it is formed. Portion 14, which extends the length of the module, is preferably a solid element or strip, and is provided with a mating groove 16 (see FIG. 3B) contiguous to the edge 27 (which is an edge of element 14). The portion of the section 14 between the groove 16 and the edge of the substrate 27 is lower than the rest of the from surface, and is preferably provided with a row of holes 17 to aid in securing the module in place. The opposite side 18 of the module 6 from edge portion 14 is provided with a similar solid edge portion 19. Edge portion 19, which also extends along the length of the module, differs from edge portion 14 in that it has a protruding shelf configuration 20 which will fit over a portion of edge strip 14 of the groove side 15 of a panel next to it. The protruding or extending shelf 20 is provided with a depending lip 21 which will fit into the groove 16 in the joined, contiguous panel. The shelf 20 is also provided with a row of holes 22 which align with matching holes 17 in the solid portion 14 of the groove side 15. The top edge 23 of the extruded substrate is provided with a projection of the lower surface 24 which functions as a skirt over which roofing material (shingles, tiles, flashing, etc). may be laid to keep rain from seeping under the modules. The bottom edge 25 of another module may also be laid over this projection 24 in systems where multiple rows of modules are placed on the roof, adjoining vertically. The lower surface panel 12 at the bottom edge 25 of the substrate may be provided with a horizontal strip of rubber material 26 glued to the substrate in order to act as a rain seal between the bottom edge 25 of the module and the roof.

The active surface of the PV cells 45 extends substantially across the face of the upper panel 11, with appropriate space left between the photovoltaic cells 45 and each edge of the module to prevent edge leakage of voltage and to prevent environmental degradation.

FIG. 2 also illustrates the means for accomplishing the transmission of electrical power from the module. The large format of the modules minimizes the number of modules, and therefore the number of PV source circuits, e.g., conductors from the modules to the common connection point(s) of the direct-current system. Therefore, in a typical installation, it becomes practical to accomplish the removal of electrical power from the module through a long "tail" 28 of jacketed, outdoor-rated, two-conductor wire which is permanently sealed and fastened into the edge portion 19 of the module substrate and electrically connected within the module to the PV cells. This 10 to 15 ft. long tail 28 is coiled for shipping and cut to size in the field. The tails 28, 28a, 28b, 28c from the respective modules lead separately to a main junction box 29, e.g., a heavy-duty electrical junction box, generally secured to a building, and connect to the main output circuit 30 of the photovoltaic system. In other words, the tail 28 functions as the PV source circuit. Where the PV source circuit is permanently fastened and sealed into, and forms an integral part of, the PV module, electrical connections at the modules themselves are unnecessary. This method of removal of power from the module significantly decreases the labor requirement and complexity of the electrical portion of the installation procedure for the modules while also reducing the probability of failure of external wiring connections. It also reduces the cost of manufacture of the modules.

FIG. 1 illustrates a view of a typical system installed on a shingle roof 7 of a residential building 5. This system consists of four modules 6d . . . 6g with a total power output order of 1.2 kilowatts. In the installation of a system requiring multiple modules, the modules would be simply lifted or slid into position on the roof with each module's shelf side 18 fitting over the groove side 15 of the connected, contiguous module. When each module is connected to the one next to it, suitable fasteners, e.g., lag screws, such as the kind illustrated in FIG. 4, are driven through the matching holes 17, 22, and into the roof decking or roof structural members (rafters, purlins, etc.). The modules are placed on the roof and screwed down one at a time, from the shelf side 18 to the groove side 15; for example, when the shelf side 18 of the module is on the left as shown in FIG. 2, installation would start with the left-most module 6d and proceed to the right until the fight-most module 6g was in place. It is anticipated that the modules will be sufficiently strong and rugged that the roofers can walk on a module or, if the roof pitch is too steep for walking, place a ladder against a module to stand on while positioning the next module.

The far left side of the system is fitted with an installation accessory piece 38 which has the same shape as the groove side solid edge portion 14. This accessory piece allows the shelf side 18 of the left-most module to be fastened down. A similar installation accessory piece 39 may be used on the far right side of the system.

The tails 28 from the four modules (see 28d, 28e, 28f, and 28g in FIG. 1) are routed from the modules to the main junction box 29, where they are connected in common to the PV output circuit.

The appearance of the finished system is that of a smooth, flat, monolithic surface the color of the PV cells. The surface would be broken only by barely perceptible vertical lines running between the modules and by the lag screw heads and washers. Lag screws and washers could be chosen to be the same color as the PV surface to hide the heads. Not only is the appearance of the installed system superior, but the natural process of snow and ice sliding off and of dirt washing off the modules is aided, and the accumulation of debris is prevented, because there are no horizontal interruptions on which the snow, ice, dirt, or debris can catch.

When multiple rows of modules are to be installed, the bottom row would be installed first, then succeeding rows working upward, with the rubber strip 26 at the lower edge of each module positioned over the upper projection 24.

Referring now to FIG. 3, a profile (i.e., edge) view of two installed modules is shown. The interconnection of modules in which a portion of the edge strip 19 fits over a portion of the groove side edge strip 14 can be seen. This is shown in enlarged detail in FIG. 3B. The left side installation accessory piece 38, which is used to fasten down the left side of the left-most module, as described above, can include a side skirt 40 (see FIG. 3) over which contiguous roofing material, e.g., shingles, may be laid by an installer. A right side installation accessory piece 39 may also be employed and provided with a skin 41 over which roofing material may be laid. In installations which omit the side skins 40, 41, the modules can simply overlap a portion of roofing material along both sides of the system. In this case, the left side accessory 38 may still be used to facilitate fastening, while the fight side accessory piece 39 may be omitted.

FIG. 3A presents an enlarged section of the front surface of the module illustrating photovoltaic (PV) cells suitably encapsulated on the face of the panel. The PV cells 45 are affixed to the upper surface of the substrate 49, which preferably is of an extruded construction, using a "permanent" adhesive 46. A topcoat 48 comprised of a thin film of fluoropolymer such as the DuPont Company composition available under the brand name "Tefzel" is then bonded to the front surface of the module using a suitable encapsulant 47 such as ethylene vinyl acetate.

The connecting elements of the module of the invention are shown in an enlarged detail in FIG. 3B and illustrate the depending edge 21 of the shelf 20 fitting into the groove 16 in the groove side containing edge strip 14. The fastener 35 fits through the matched holes 17, 22 and into the roof sheathing and/or roof framing members, with a sealing washer 36 to seal the hole.

Referring to FIG. 4, one method for fastening down the modules is shown in detail. Cylindrical, flexible foam inserts 37 with holes in their center are glued into the groove side holes 17 of the solid edge portion 14 to act as a guide for properly positioning fasteners 35. This arrangement leaves a small gap between the fasteners's shaft 34 and the walls of the hole 17, thus allowing for thermal expansion/contraction. The fastener 35 is placed into the foam insert 37, preferably with a sealing element such as a rubber-coated washer 36. Optionally, lag screws 35 with sealing washers integrally formed may be used.

Figure 5:
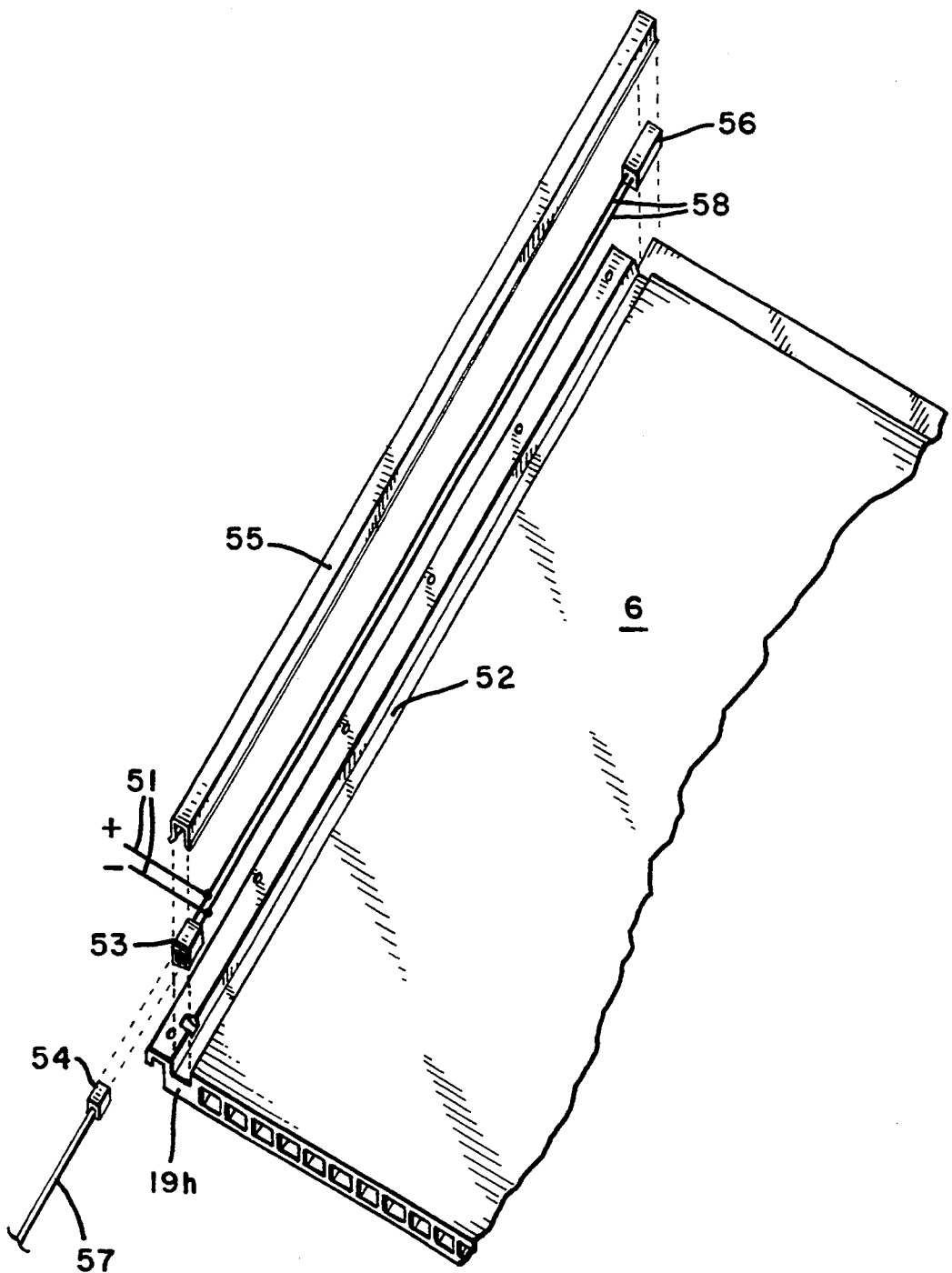
FIG. 5 is a fragmentary, partially exploded view of the module showing an alternative embodiment and the assembly and means for transmission of electrical power from the module.

Referring to FIG. 5, an alternative means is shown for removing electric power from a module of the present invention. Wires 51 connected to the interconnected photovoltaic cells to receive and transmit electrical power from said cells are shown. Wires 51 may be sealed into a trough 52 in one solid edge portion 19h. This solid portion 19h may also accommodate a recessed, weatherproof electrical output power connector 53 at its bottom edge to accept a male, plug-in connector 54 to connect the power output from the module to the source circuit 57. A suitable snap-in plastic cap strip 55 is preferably used to cover the wiring trough, and may aid in sealing the trough and aid in restoring an uninterrupted surface at the upper face 11 of the module.

The modules of the present invention may be manufactured in a sufficiently large format so that in nearly all residential rooftop installations, a single, horizontal row of modules, positioned contiguously as illustrated in FIG. 1, will make up the system. However, in cases where multiple rows of modules are deemed more appropriate, the modules may also be adjoined top-to-bottom. For the wiring arrangement, the upper surface of the solid edge member 19h may be provided with the wiring trough 52 and optionally with an extension consisting of a plug-in input connector 56 of the same type that is used at the end of the PV source circuit 54, and which is connected through wires 58 in the wiring trough 52 to the output wires 51 and the output connector 53 for parallel connection of multiple panels. The input connector 56 may also be wired for series connection of multiple panels. Parallel wiring connections are shown in FIG. 5. When an input connector 56 is included but is not used, it may be covered and sealed.

it will be apparent to one skilled in the art that various modifications to details may be made without departing from the spirit and scope of the invention within the claim which follows:

What is claimed is:

1. A modular photovoltaic panel comprising in combination:
   (a) a substrate comprising a composite of a first upper planar surface joined with a parallel lower surface secured in a substantially uniform spaced relationship relative to said upper surface by a plurality of spaced connecting members that define air flow passages between said upper and lower planar surfaces;
   (b) a plurality of photovoltaic cells electrically interconnected and encapsulated in a transparent resinous polymer composition and secured on the surface of said upper panel;
   (c) a first linear side edge portion having a substantially uniform cross section and a complementary second side edge portion on the opposite edge of said substrate, said first and second side edge portions having a thickness substantially equal to that of the composite of the joined upper and lower planar surfaces;
   (d) said first side edge portion being provided with a mating edge devised to mate, in a substantially water impermeable seal, with the opposite complementary mating edge of a like contiguous module;
   (e) means to secure on a roof at the side edge portions of said modules, and in a water impermeable seal, a pair of said substrates; and
   (f) an electrical wiring connected to the plurality of the photovoltaic cells in said module and for receiving and transmitting electrical output from said cells.

2. A solar module according to claim 1 wherein said first edge portion and said complementary edge portion are provided with an extension having a thickness less than the thickness of the edge portions, said first edge extension being provided with a depending linear portion and said complementary edge extension portion being provided with a linear groove for receiving a depending linear portion of a contiguously positioned and interfitted like module.

3. A solar module according to claim 1 wherein a skirt portion on which contiguous roofing material is applied is provided along the top edge of the module, said skirt comprising an extension of said parallel lower surface.

4. A solar module according to claim 1 wherein an outdoor-rated wire is integrally formed into one edge portion of said module to receive electrical output from the photovoltaic cells and to transmit said electrical output from the module, and wherein said wire extends from the module to function as a photovoltaic source circuit.

5. A solar module according to claim 1 wherein an electrical wiring trough extending substantially along the length of the module is formed in an edge portion of said module and wire conductors are sealed in said trough below the surface of said module.

6. A solar module according to claim 5 wherein said trough terminates in an integrally formed electrical connector to receive electrical output from the photovoltaic cells and to transmit said electrical output from the module through a mating electrical connector to me external electrical circuit.

7. A solar module according to claim 1 wherein preformed securing openings are provided in the first edge portion and complementary mating holes are provided in the opposite edge portion for receiving a module securing fastener through both holes of contiguously joined modules.

8. A method of making a modular photovoltaic panel comprising:
   (a) forming an integrated unitary composite of a first upper planar surface joined with a parallel lower surface secured in a substantially uniform spaced relationship relative to said upper surface by a plurality of spaced connecting members that define air flow passages between said upper and lower planar surfaces;
   (b) affixing a plurality of electrically interconnected photovoltaic cells on the surface of said upper panel;
   (c) encapsulating said cells in a transparent resinous composition;
   (d) providing a first linear side edge portion having a substantially uniform cross section one side of said substrate and forming a complementary second side edge portion on the opposite edge of said substrate, said first and second side edge portions having a thickness substantially equal to that of the substrate composite of the joined upper and lower planar surfaces;
   (e) providing on said first side edge portion a mating configuration devised to mate, with the opposite complementary mating edge of a like contiguous module;
   (f) providing the side edge portions with a panel securing means; and
   (g) providing on said module an electrical wiring connected to the plurality of the photovoltaic cells in said module and to means for receiving and transmitting electrical output from said cells.

9. The method of claim 8 wherein the edge portions are provided with water-impermeable sealing means.

10. The method according to claim 8 comprising additionally providing said first edge portion and said complementary edge portion with an extension having a thickness less than the thickness of the edge portions, providing said first edge extension with a depending linear portion and providing said complementary edge extension portion with a linear groove for receiving a depending linear portion of a contiguously positioned and interfitted like module.

11. The method according to claim 8 comprising additionally providing a skirt portion at the top edge of the module, said skirt comprising an extension of said parallel lower surface.

12. The method for making a solar module according to claim 8 comprising additionally providing an outdoor-rated wire integrally formed into one edge portion of said module to receive electrical output from the photovoltaic cells and to transmit said electrical output from the module, wherein said wire extends from the module to function as a photovoltaic source circuit.

13. The method for making a solar module according to claim 8 comprising additionally forming an electrical wiring trough extending substantially along the length of the edge portion of said module and sealing wire conductors in said trough below the surface of said module.

14. The method for making a solar module according to claim 8 comprising additionally integrally forming in an end of an edge portion an electrical connector to receive and transmit electrical output from the photovoltaic cells.

15. The method for making a solar module according to claim 8 comprising additionally providing a preformed module securing opening in the first edge portion and complementary mating hole in the opposite edge portion for receiving a module securing fastener through both holes of contiguously joined modules.

16. The method for making a solar module according to claim 8 comprising extruding the integrated, unitary composite of the first and second planar surfaces in a spaced relationship from a synthetic resinous composition.

17. The method of claim 8 wherein the integrated, unitary composite is a foamed synthetic resin.

* * * * *